Nov. 29, 1960 P. P. NAMIAN 2,962,213

ELECTRIC DIGITAL COMPUTERS

Filed Nov. 25, 1957

INVENTOR.
PAUL PIERRE NAMIAN

BY
Theodore [illegible]
ATTY 2,962,213

ELECTRIC DIGITAL COMPUTERS

Paul Pierre Namian, Asnieres, France, assignor to Societe d'Electronique et d'Automatisme, Courbevoie, France Filed Nov. 25, 1957, Ser. No. 698,653

Claims priority, application France Dec. 12, 1956

6 Claims. (Cl. 235—157)

The present invention concerns improvements in or relating to electric digital general purpose computers operative to complete any computation program previously written in code or language and introduced into the computer for data processing.

A program for general purpose computers consists of a sequence of instruction-words, and each word includes a symbol or letter defining an elementary operation of either arithmetical, logical and/or functional character, at least one reference to a number to be handled, i.e., a storage address, and usually, several auxiliary symbols (hereinafter referred to as "tags") relating to subcharacters of other informations contained in such a word. Within the computer, an instruction-word appears as a numerical code of predetermined number of digits; it is actually composed of several distinct codes, each relating to a particular kind of information and having a predetermined location within each word to permit the computer to read and interpret each subcode as a separate item in accordance with its specific location in each instruction-word.

Figure 1:
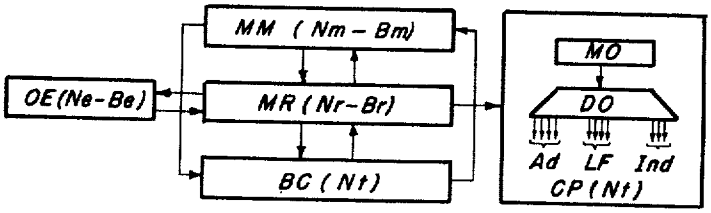

For the purposes of the invention, a general purpose computer may be summarized sufficiently as shown in Fig. 1 of the accompanying drawings. It comprises a general or main store MM of large word capacity, such as a magnetic drum, the access time of which is usually definitely longer than the time interval necessary for the execution or completion of an elementary operation as defined above. The computer also includes a smaller store MR, as for instance, a number of magnetic core matrices, the access time of which is definitely shorter than that of main store MM, and an arithmetical unit BC. Transfers of informations may be made between one of stores MM and MR and arithmetical unit BC, and quite often such transfers will be made between these two stores in accordance with "blocks" of information-words. On the other hand, an information transfer concerning the arithmetical unit generally will only relate to a single word.

Both main and fast access stores MM and MR may be considered as forming part of the computer proper. Obviously, storing equipment external to the computer is also used to introduce data and extract results as illustrated in Fig. 1 at OE. In the example shown any introduction or extraction of words is made through the intermediary of fast access store MR. Such an arrangement, however, is not imperative since such external equipment may be coupled to the computer through the intermediary of arithmetical unit BC providing the proper conversion of the presentation of words adapting the codes of the computer to those of the storing equipment and conversely.

The operation of the computer is controlled and monitored from a set of program control circuits CP. For the purpose of the invention, it is sufficient to note that within these circuits there are included: a one-word instruction store MO and its decoder DO. In the example shown decoder DO has three sets of outputs, viz. Ad (addresses), LF (function letter or symbol) and Ind (subcharacter tags). As stated above, an instruction-word having only one function letter or symbol may contain several addresses and also several tags.

Arithmetical unit BC may comprise several accumulators and registers, each having the capacity of one word. The program circuits may include accumulators or registers of such one-word capacity.

In a computer such as shown in Fig. 1, four kinds of word addresses are present: Store MM contains the "magnetic" addresses $N_m$; store MR, the "fast" addresses $N_r$; equipment OE, the external addresses $N_e$; arithmetical unit BC and, as the case may be, program circuits CP, accumulator and register adresses $N_t$. Each of addresses $N_m$ and $N_r$ refers to a location of a word in stores MM and MR, each address $N_e$, to a distinct external apparatus (punch tape readers and recorders, magnetic tape readers and recorders and the like, plotters, and so forth); each address $N_t$ refers to a one-word store.

In order to permit block transfer operations, the overall number of magnetic addresses $N_m$ is divided into a number of groups, each group having a group address $B_m$. Similarly, the overall number of fast addresses $N_r$ is divided into a number of groups, each group having a group address $B_r$. Consequently, for such a block transfer operation, an instruction relating thereto needs only to include a group address. Further, special instructions may be provided to search the external storing equipments and, for such an instruction, a group address $B_e$ may be provided to discriminate between groups of external equipment OE.

Up to the present time, it has been usual to reserve in any instruction for an address number a location having as many digit locations as required to write the highest number of an address in main store MM. It will be understood that the numbering of the addresses in the main and in the fast access stores may include the same numbers up to the highest number of the fast access store, since the function letter in an instruction word enables the discrimination of the store concerned generally in an automatic fashion as soon as the instruction concerned is decoded for its execution.

As an example, a computer may have code instructions comprising the code of the following different types.

Instructions referring to a main store address.

Instructions referring to a fast access store adress.

Instructions referring to an external equipment address.

To illustrate this example, the main store may consist of a magnetic drum of 128 tracks, each track locating 128 words. The first track, numbered 0, is usually reserved to store the so-called original or permanent instructions which do not vary throughout the exploitation of the computer and are mainly directed to the introduction of data and programs into the computer stores. In such a case, fourteen digits are required to number the magnetic addresses, from 128 to 16,383. On the other hand, a fast address need only comprises ten digits for example a fast address store of 1,024 word locations (numbered from 0 to 1,023).

The numbering of group addresses $B_m$ and $B_r$, as well as $N_e$, $B_e$ and $N_t$, will only require a definitely lower number of digits.

The number of digit locations in a word (this number or "length" is usually made the same for instruction-words and number-words in a computer) results from a choice based on several factors, such as speed of computer operation, maximum value of a numerical quantity to be handled, volume and cost of stores, number of function letters and number of "tags." While a relatively short length of a word improves the speed of operation and decreases volume and cost of stores, it limits the maximum value of the numerical quantities handled in the computer and decreases its flexibility of operation by decreasing the possibilities of a relatively high number of function letters and tags. This is because within an instruction, the number of digits must be divided into a function letter or symbol determining the type of operation to be performed and a small number of tags and at least one adress of a word store location: Certain, if not all, instructions require two addresses as in the case of some known computer program codes.

For word length based on considerations such as defined above, it has been usual up to the present time to reserve a definite number of digits and definite digit locations for the various items of an instruction. It is apparent that this type of instruction writing leads to serious drawbacks; it either limits the number of useful digits in the number-words and requires a relatively high number of instructions for the various routines of a program, or it lengthens the words unduly thereby increasing volume and cost of the stores and reducing the speed of computation.

If, for instance, in the above example, fourteen digits were required for a main store address, twenty-six digit locations being required for a numerical quantity, it is apparent that only twelve digit locations would remain in an instruction word for the function letter, tags and second or auxiliary address. Furthermore, if for instance, thirty-two function letters are to be provided for a reasonable speed of computation, only seven binary digits will remain for tags and second address. This may be quite insufficient because a practical computer utilizing the above-defined factors may well involve at least nine tags and up to sixty-four external addresses $N_e$, as an example of second addresses, thus greatly exceeding the capacity of an instruction-word.

One of the objects of the invention is to avoid such drawbacks and limitations by permitting, in an instruction-word, a set of digits occupying a definite location to be differently interpreted in accordance with the significance of another set of digits in the instruction word.

More specifically the functions and addresses of numbers may be grouped and the group be identified by an additional coding.

Another object of the invention is to make the code of the function letter of the instruction code "variable" in that the number of digits and their locations are caused to vary from a certain character or type of instruction to another character or type of instruction, a small number of digits of permanent location being provided in each instruction-word to control at the decoder the location and digital extent of the function letter, as well as, when required, the interpretation of other parts of the instruction-word. Thus, for instance, as another object of the invention, this small number of digits may further define whether the instruction contains a single store address or a main address plus a second address, whether the address is that of a location in the magnetic store, fast access store, external storing equipment, and so forth.

A further object of the invention is a general purpose digital computer including a decoder for its one-word instruction store operative in the first place to test a small number of digits of permanent location in an instruction word, in the second place, occasionally to test other predetermined parts of the instruction-word as indicated by the result of the first testing operation, and finally to route the various groups of digits in the instruction-word to their different and final decoders.

More specifically according to the invention an electric digital general purpose computer comprises a one-word instruction store and a decoder arrangement, the latter containing a function decoder in which a first group of circuits for analyzing the content of a partial function letter code of small number of digits having a constant store location controls a first group of one digit stores, and in which second groups of circuits analyzing the contents of further partial function letter codes are controlled from one of the one-digit stores of the first group of one-digit stores; each one of the second groups of analyzing circuits being fed from identical locations in the instruction store; said locations in the instruction store being different for at least one of the second groups from the locations for another of the second groups; the analyzing circuits of the second groups activate a number of second one-digit stores.

In an embodiment of the invention, at least part of the analyzing circuits of the second groups is controlled by intermediate one-digit stores which in turn are controlled by intermediate analyzing circuits associated with part of the one-digit stores of the first group; these intermediate analyzing circuits receive from the instruction store further partial codes of the function letter code stored therein.

The partial codes analyzed by the first analyzing circuits may belong to a category of instructions referring to certain kinds of instruction addresses, while the partial codes analyzed by the circuits of the second groups may serve to specify the function letters within these categories, and the intermediate analyzed codes may refer to the number of addresses in the instructions.

These and other objects of the invention will be described more fully with reference to Fig. 2 of the accompanying drawings which illustrate in block diagram an arrangement of a one-word instruction store and its decoder, embodying certain principles of the invention. This arrangement refers to a computer wherein Any address $N_m$ comprises fourteen digits,
Any address $N_r$ comprises ten digits,
Any address $N_e$ comprises six digits,
Thirty-two function letters are used,
Nine characterization tags are used,
An instruction includes twenty-six significant digits,
An instruction may comprise either a single address or in some cases, two addresses, the second being either an address $N_t$ or an address $N_e$. An address $N_t$ may have two digits.

In this computer, furthermore, only four distinct types of instructions are provided so that, in any instruction-word, only two digits are required to define the type or category to which an instruction belongs. These two digits, for instance, will be placed at digital locations 15 and 16 of an instruction when introduced in the one-word instruction store MO.

In order to illustrate this procedure, the following category code is selected:

0 0 for any instruction referring, in at least some cases, to a magnetic address $N_m$ (characterization tags enabling the interpretation of such a magnetic address as a fast address $N_r$ when required), 0 1 for any instruction wherein only a fast address $N_r$ may be written, and no external address may be used, 1 0 for any instruction having a main address of the $N_r$ type and at least one second address $N_e$ referring to an external storing apparatus, 1 1 for any instruction solely referring to one or several external addresses $N_e$.

Figure 2:
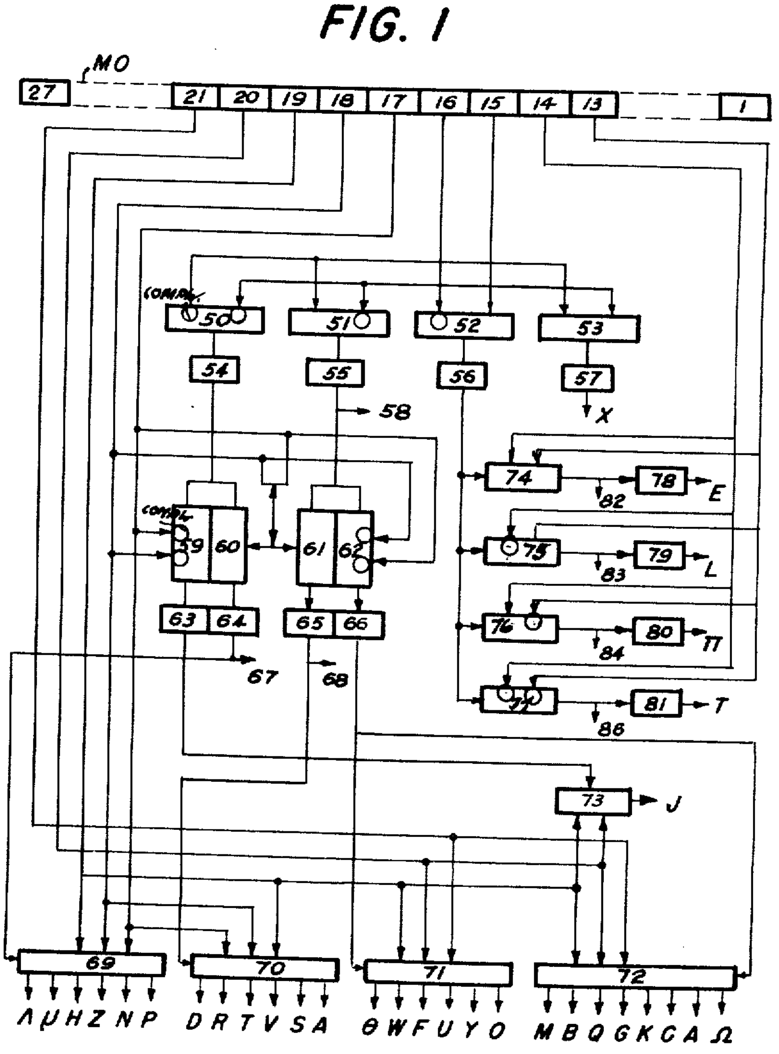

In Fig. 2 any input to a coincidence circuit marked with a small circle represents a complementary input of the coincidence circuit. Complementation is a simple and well known operation, for instance by means of a triode receiving the signal on the control grid and feeding the input of the coincidence circuit proper from its plate.

More specifically, in circuit 5 of Fig. 2 both inputs are complemented; in 51 the right input and in 52 the left input is complemented; in 53 no input is complemented. The same applies to circuits 59, 62, 75, 76, 77 and 73 respectively.

The device works in binary numeration.

In Fig. 2, coincidence circuits 50 to 53 serve to analyze this code in an instruction. Circuit 50 delivers a pulse activating one-digit store 54 for instance a bistable trigger stage in case both the digital values at locations 15 and 16 are 0. Circuit 51 delivers a pulse activating one-digit store 55 in case the digital value at 15 is 0 and the digital value at 16 is 1. Circuit 52 delivers a pulse activating one-digit store 56 in case the digital value at 16 is 0. Circuit 53 delivers a pulse activating value at 15 is 7 and the digital value at 16 is 0. Circuit 53 delivers a pulse activating one-digit store 57 in case both digital values at 15 and 16 are 1.

This arrangement may be simplified bearing in mind that a single instruction may exist, function letter X, as a fourth category of instructions determining the type of operation to be performed. In such an instruction, there exists a main address $N_e$ having fourteen digits and a second address $N_e$ having six digits. This instruction controls a search in the external apparatus for selecting the data occupying the location of the second address. It is clear that the code of the function letter X may then be made of two digits (11) of one-word instruction store locations 15 and 16. The decoding process then results in activation of one-digit store 57 which will produce function letter X at its output. Output voltage X, of course, is used to route the codes of addresses $B_e$ and $N_e$ towards the address decoders. Since such address decoders are well known they are not shown.

The specific response of one-digit store 57 to an activation signal from 53 is to pass from void or clear condition to the activated or filled condition. When this store is at work the output lead of 57 is at a high voltage position denoting the "decoding" of function letter X.

In this connection it will be noted that "decoding" simply consists of comparing a code configuration in MO by means of a coincidence circuit to which there is applied a predetermined selection of location contents MO, and which activates a one-digit store each time the coincidence circuit detects a complete code coincidence.

To use such voltage detecting letters or symbols in a computer of the type concerned for controlling the routing of the data within the computer structure to execute certain elementary operations is well known, see for example Transactions of the I.R.E. Electric Computer Section, June 1954, Fig. 4 of the article "System Design of SEAC and DYSSEAC," page 14, and March 1954, page 9, left column.

Since functions X include the data at the $N_e$ and $B_e$ store addresses, the code of such addresses existing in MO will be routed to their decoders under the control of the activation of output 57. All that is apparently necessary to effect this routing is to provide as many gates as there are address digit locations in MO, and to control these gates selectively from outputs X, E, T, . . . to "decoders" which are, as shown for the function letters, combinations of coincidence circuits.

Each of these address decoders includes a number of one-digit stores equal to the number of digits in the address concerned. The one-digit address stores are reached from the corresponding locations of instruction store MO through a corresponding number of gates controlled from the decoder of the function letter appearing at the routing outputs of these decoders.

In the instruction containing function letter X, there remains a place for four digits corresponding to characterization tags. The use of such characterization tags per se is conventional in the art of digital computers. Some tags may be used for code address modification purposes, others for denoting that a numerical quantity is that defined by the address proper, still others may consist of symbols determining a choice among the stores, or a special code letter characterization, and so forth.

Considering now the group of instructions defined by code 10 at digital locations 15 and 16 in instruction store MO, viz. any instruction having a first address which is an $N_r$ address, and a second address which is an $N_e$ address, this group may be exemplified by four instructions including the following function letters, respectively:

E, controlling the writing of an internal data to a specified recorder in the external equipment, $\pi$, controlling the recording of a complete typographic character in an external apparatus, L, controlling a reading of a data on an external equipment and its introduction into the computer, T, controlling a block transfer of data from an external equipment into the computer, or conversely, according to the presence of a definite characterization tag in the instruction.

In order to discriminate between these four types of instructions, two further digits are sufficient, and the four function letters need each four digits only, viz., the two digits at locations 15 and 16, as stated, plus, for instance, the two digits at locations 13 and 14 of instruction store MO. These digit locations 13 and 14 are reserved due to the fact that such instructions include a fast access store address $N_r$, i.e., a code written in digits 1 to 10 in instruction store MO. Locations 11 and 12 will remain reserved for the recording of characterization tags. As an example, the second address will occupy digit locations 17 to 21 when function letter is N, L or $\pi$, or digital locations 17 to 22 for function letter T. Further characterization tags may then be placed in the last digital locations of the instruction-word.

In the decoder, the output of one-digit store 56 is applied to the control input of four separate coincidence or gating circuits, 74 to 77. The further outputs of digital locations 13 and 14 of MO are applied to the pair of information inputs of gates 77 and 74, according to the four combinations 00, 01, 10 and 11. This arrangement results in the selective activation of one of the four one-digit decoder stores 78, 79, 80 and 81, for the function letters E, L, $\pi$, T, respectively, according to the actual content of location pair 13 and 14 in MO when 56 has been activated from the content of location pair 15 and 16 of MO. Outputs 82 to 85 derived from gates 74 to 77 serve to control the address decoders for the instructions concerned with such function letters.

For each of the two first categories of instructions, i.e., characteristic codes 00 and 10 at locations 15 and 16 of MO, two alternatives exist, either there is or there is not a second address. The digit locations 17 and 18 may be reserved in such categories of instructions for defining these alternatives; for instance, code 00 at these locations will denote an absence, and code 11 or 01 or 10 (either of these three codes) the presence of such a second address. The outputs from 54 and 55 are applied to gating circuits 59 and 60, and gating circuits 61 and 62, respectively. Circuit 59 (for a magnetic address $N_m$) and circuit 62 (for fast access address $N_r$) can only activate respectively one-digit store 63, 66 when both digits at locations 17 and 18 of MO are 0. On the other hand, circuit 60 (for a magnetic address $N_m$) and circuit 61 (for a fast address $N_r$) can only activate its respective one-digit store 64, 65 when the union (i.e., the logical sum) of the digits at locations 17 and 18 of MO shows that at least one of these digits is 1.

The output from 55 branched off at 58 is also used to control the selection of fast addresses $N_r$ (digital locations from 1 to 10 in MO). In any instruction having a first $N_r$ address, locations 11 to 14 will be reserved for characterization tags.

To sum up, activation of one-digit store 63 will indicate that an instruction in MO contains a magnetic address $N_m$, digital locations 1 to 14, without a second address in the instruction. The function letter may use seven digital locations 15 to 21, and digital locations 22 to 26 may be used for characterization tags. Activation of one-digit store 66 will indicate that an instruction within MO contains fast address $N_r$, digital locations 1 to 10, and no second address; the function letter may use seven digital locations, 15 to 21, and nine characterization tags may be used in such an instruction, at locations 11 to 14 and 22 to 26. Activation of one-digit store 64 will indicate that instruction within MO contains a first address which is of the magnetic $N_m$ type, and a second address which selectively routed by branch 67 connected to the output of store 64. In case the second address is that of an accumulator in the arithmetical unit comprising for instance four accumulators, two digits are necessary for such a second address, for instance at locations 20 and 21 of MO; and the function letter may use five digital locations, 15 to 19; five characterization tags may be used, digital locations, 22 to 26 of MO. Finally, activation of 65 will indicate that an instruction within MO contains an address $N_r$ and a second address, the routing of which will be controlled by branch 68 connected to the output of 65; nine characterization tags may be used, digital locations 11 to 14 and 22 to 26 in such an instruction.

It may be noted that 27 digital locations are shown in MO. Location 27 is provided for a gap digit between words, as usual in computers of the type concerned.

In connection with the above defined decoding condition, the decoders for the various function letters are not further shown in detail. Activation of 64 produces the activation of a group of decoder circuits, indicated at 69, including as many circuits as there are function letters in the category of instructions concerned, having two addresses one of which is of the magnetic type.

The arrangement of circuit 69 may easily be understood from what is shown for the function letter decoders of instructions containing an external address, gating arrangement 74 to 81. Thus each decoder circuit of the group will have a coincidence gating circuit and a one-digit store associated therewith. As an illustration, the function letters of the category decoded in 69 are as follows: Λ, introduction into an accumulator of the arithmetical unit of a word located at a magnetic store address; μ, recording at a magnetic store location of the content of one of the accumulators of the said arithmetical unit; H, overflow test of a result of an elementary operation within an accumulator of the arithmetical unit; Z, test of nullity of the content of an accumulator of the arithmetical unit; N, negative sign test for such a content; P, positive sign test for such a content. All the test operations may lead to the introduction into a sequence control member of the computer of a word located in the magnetic store, address $N_m$ or, in case a special characterization tag is present, introduction of a corresponding word into the fast access store, address $N_r$.

Activation of 63 leads to the selective activation of one decoder amongst a group of decoders of function letters for that category of instructions including a single magnetic store address (or other special instructions not including a second address or even no main or first address).

By way of illustration, this latter category may include: O, unconditional or imposed break of sequence; the content of the address is introduced in the sequence control member of the computer, usually from the magnetic store although when a characterization tag is present, this may be derived from a fast access store of the computer; Y, manual control; a sequence break leads to the introduction into the sequence control member of an instruction prepared by the operator in a specialized encoder; U, round-off made on the content of a store location, usually a magnetic store location or, when a special characterization tag is present, a fast access store location; F, stopping of a computation (this function is characteristic in that no address is included in the corresponding instruction word); W, block transfer of short duration; characterization tags are present for controlling the direction of such a transfer between the magnetic and fast access stores, and the address portion of the instruction is made up of a group address $B_m$ plus a group address $B_r$ such as defined above; O, block transfer of long duration; the instruction also comprises characterization tags and paired group addresses as for W. The decoder group is shown at 71 for this category of instructions.

Activation of 65 leads to the selective activation of a group of decoders 70 referring to function letters concerning operations for which a fast access address and a second address are necessary. By way of illustration, there are the following: D, shift of the content of an accumulator in the arithmetical unit by a quantity defined by the content of a fast access store location; R, introduction at a location of the fast access store of the content of one accumulator of the arithmetical unit, with or without erasing the record in the accumulator according to a special characterization tag in the instruction concerned; I, intersection or an operation between the content of an accumulator of the arithmetical unit and the content of a fast access store location; V, disjunction operation (exclusive OR) between the content of an accumulator of the arithmetical unit and the content of a fast access store location; S, subtraction between such contents; A, addition of such contents.

Activation of 66 leads to the selective activation of a group of decoders for the function letters for that category of instructions including a single fast address (principally because the arithmetical unit accumulator or accumulators concerned are predetermined by a permanent wiring). This group of decoders is shown at 72 and deals for instance with the following function letters: Ω, erasement of a word; Δ, change of address from instruction; C, denominational shifting according to a quantity indicated by the content of a fast access location; K, automatic denominational shifting of the content of an accumulator; G, square root operation applied to the content of an accumulator; Q, division of the content of an accumulator by the content of a fast access store location; M, multiplication of the content of an accumulator by the content of a fast address store location, the product being added to that of the accumulators receiving it; B, multiplication by which the result is subtracted from the content of the accumulators receiving it; in both these latter operations, a characterization tag may be used for producing an erasement of the content of the accumulators in which the product of the multiplication is to be introduced.

It may be noted that there is no need to apply all the digits of the function letters to the groups of decoders since a partial decoding has been made previously. Only decoder groups 69 and 70 require the digits of locations 17, 18 and 19 of MO, and decoder groups 71 and 72, the digits of locations 19, 20 and 21.

A further possibility exists in such an arrangement for certain special instructions such as, for instance, a so-called "symbolized operation" instruction representing by way of illustration function letter J. This instruction does not need any storing address but refers to predetermined sub-routines recorded in the stores from predetermined addresses. A large number of digit places is required to write in such an instruction the symbols identifying the required sub-routine. Consequently, such type of instruction may be identified with magnetic address instructions for its first segregation and its function letter may only occupy digit places 15 to 20, the location of the addresses being used for identification symbols as defined above. The decoding of such an instruction may be operated by the activation of 63 with the use of a special circuit 73 receiving the digits of locations 19 and 20 of MO. Its code will be so selected as to be different from the codes of any other instruction of the same group of first identification at the same places.

Any intersection or code analyzing circuit must be understood as receiving the digits from MO in either their direct form (inputs only marked by an arrow) or their complementary form (inputs further marked by a small circle) in order to take the 0's digits into account at such intersections.

What is claimed is:

1. In an electric digital computer, a one-word instruction store and a decoder therefor, and in said decoder, a function letter decoder comprising a first group of circuits for analyzing a part only of said function letter code, the digits corresponding to said function letter part having a location in said instruction store which is constant for a number of instructions, a first group of one-digit stores controlled by the analyzing circuits of said first analyzing group, a number of second groups of circuits for analyzing partial codes and corresponding in number to that of the one-digit stores of said first store group, each of said second group analyzing circuits being controlled by a distinct combination of digits of an instruction, and by one of said one-digit stores of the said first store group, said distinct digit combination being contained at locations in said instruction store which are the same within each group of said second group but which are different from one group of said second groups to another of said second groups; and further one-digit stores equal in number to, and controlled by, the analyzing circuits of said second groups.

2. Combination according to claim 1 comprising intermediate one digit-memories and intermediate analyzing circuits associated with part of the one-digit stores of said first store group, and wherein at least part of the analyzing circuits of said second groups is controlled by said intermediate one-digit memories; the latter being controlled by intermediate analyzing circuits associated with part of the one-digit stores of said first store group, said intermediate analyzing circuits receiving from said instruction store further partial codes of the letter function code contained therein.

3. Combination according to claim 1 wherein at least one of the one-digit stores of said first store group determines a corresponding function letter of the instruction language.

4. Combination according to claim 2 wherein the partial code analyzed by the first analyzing circuits is that of a category of instructions referring to certain types of addresses in said instructions, while the partial codes analyzed by the circuits of said second groups refer to particularization of the function letters proper in said categories; and wherein the intermediate analyzed codes, if any, relate to the numbers of addresses in said instructions.

5. Combination according to claim 2 wherein each of said analyzing circuits comprises at least one AND circuit for the logical intersection of bit-representing signals.

6. Combination according to claim 2 comprising address codes in the instructions concerned, and wherein at least part of the outputs of said one-digit stores are derived for the control of routing of said address codes.

References Cited in the file of this patent

UNITED STATES PATENTS

| | | |
|---|---|---|
| 2,796,218 | Tootill et al. | June 18, 1957 |
| 2,799,449 | Turing et al. | July 16, 1957 |